US012350924B2

(12) United States Patent
Izaguirre

(10) Patent No.: US 12,350,924 B2
(45) Date of Patent: *Jul. 8, 2025

(54) # DEVICE FOR APPLYING A FLUID TO A ROLLER

(71) Applicant: MACARBOX S.L.U., Irura (ES)

(72) Inventor: Antonio Izaguirre, Irura (ES)

(73) Assignee: MACARBOX S.L.U., Irura (ES)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,922

(22) Filed: Sep. 26, 2023

(65) Prior Publication Data

US 2024/0009992 A1 Jan. 11, 2024

Related U.S. Application Data

(63) Continuation of application No. 15/771,403, filed as application No. PCT/EP2016/075810 on Oct. 26, 2016, now Pat. No. 11,806,985.

(30) Foreign Application Priority Data

Oct. 27, 2015 (EP) .................................... 15382527

(51) Int. Cl.
*B41F 31/02* (2006.01)
*B05C 1/08* (2006.01)
(Continued)

(52) U.S. Cl.
CPC .......... *B41F 31/027* (2013.01); *B05C 1/0813* (2013.01); *B41F 5/24* (2013.01);
(Continued)

(58) Field of Classification Search
CPC ........ B41F 31/027; B41F 31/20; B41F 9/068; B41F 9/1027; B05C 1/0813; B05C 1/081; B05C 1/0834; B05C 1/083; B05C 1/0817
See application file for complete search history.

(56) References Cited

U.S. PATENT DOCUMENTS 5,085,144 A 2/1992 Lindstrom et al.
5,406,887 A 4/1995 Hertel et al.
(Continued)

FOREIGN PATENT DOCUMENTS

CN 1137977 A 12/1996
CN 1077505 C 1/2002
(Continued)

OTHER PUBLICATIONS

CN Office Action issued Sep. 24, 2019 re: Application No. 201680069541.7, pp. 1-13 with translation.
(Continued)

*Primary Examiner* — Jennifer Bahls
*Assistant Examiner* — Quang X Nguyen
(74) *Attorney, Agent, or Firm* — CANTOR COLBURN LLP

(57) ABSTRACT

A fluid distribution device, for applying a fluid onto a transfer roller, includes an elongated chamber, at least one inlet for letting a fluid into the chamber, a longitudinal opening extending in the axial direction and adapted to face a transfer roller to allow fluid to exit the chamber and contact the transfer roller, and at least one wiper blade extending along at least a portion of the longitudinal opening. The chamber includes, at each of the two axial ends of the chamber, a wall separating the chamber from a cavity. The wall has a wall surface arranged to face the transfer roller when the device is in use. The wall is dimensioned so that the wall surface will be distanced from the transfer roller when the device is in use, so as to allow fluid to be present in a gap between the wall surface and the transfer roller.

26 Claims, 10 Drawing Sheets

(51) Int. Cl.

| | |
|---|---|
| ***B41F 5/24*** | (2006.01) |
| ***B41F 31/04*** | (2006.01) |
| ***B41F 31/20*** | (2006.01) |

(52) U.S. Cl.

CPC .............. *B41F 31/04* (2013.01); *B41F 31/20* (2013.01); *B05C 1/0817* (2013.01); *B05C 1/083* (2013.01); *B05C 1/0834* (2013.01); *B41P 2231/20* (2013.01)

(56) References Cited

U.S. PATENT DOCUMENTS

| | | | |
|---|---|---|---|
| 5,662,042 | A | 9/1997 | Compton et al. |
| 5,927,199 | A | 7/1999 | Achelpohl et al. |
| 6,012,391 | A | 1/2000 | Weishew |
| 6,029,573 | A | 2/2000 | Capdeboscq |
| 6,183,075 | B1 | 2/2001 | Sasaki |
| 2003/0089256 | A1 | 5/2003 | Leimand |
| 2003/0121435 | A1 | 7/2003 | Jendroska et al. |
| 2009/0193990 | A1 | 8/2009 | Van Denend |
| 2011/0061550 | A1 | 3/2011 | Nielsen |
| 2012/0121814 | A1 | 5/2012 | Krautkramer et al. |
| 2012/0210891 | A1 | 8/2012 | Masuch et al. |
| 2012/0304878 | A1 * | 12/2012 | Zhang ................ G03G 21/0088 101/177 |
| 2014/0230672 | A1 | 8/2014 | Andersson |
| 2015/0286161 | A1 | 10/2015 | Foley |
| 2018/0333951 | A1 | 11/2018 | Izaguirre |

FOREIGN PATENT DOCUMENTS

| | | | |
|---|---|---|---|
| CN | 101214754 | A | 7/2008 |
| CN | 204451494 | U | 7/2015 |
| DE | 19516223 | A1 | 11/1996 |
| WO | 2009089672 | A1 | 7/2009 |

OTHER PUBLICATIONS

International Search Report issued Feb. 3, 2017 re: Application No. PCT/EP2016/075810; pp. 1-5.

Written Opinion issued Feb. 3, 2017 re: Application No. PCT/EP2016/075810; pp. 1-6.

* cited by examiner

DEVICE FOR APPLYING A FLUID TO A ROLLER

CROSS-REFERENCE TO RELATED APPLICATIONS

This application is a Continuation of U.S. patent application Ser. No. 15/771,403, filed on 26 Apr. 2018, which is a 35 U.S.C. § 371 National Stage patent application of PCT/EP2016/075810, filed on 26 Oct. 2016, which claims the benefit of European patent application no. 15382527.8 filed 27 Oct. 2015, the disclosures of which are incorporated herein by reference in their entirety.

TECHNICAL FIELD

The disclosure is related to the delivery of fluid to rollers, for example, to the delivery of ink to a roller, such as to a roller in a flexographic printing system.

BACKGROUND

It is known in the art to transfer a fluid to a roller, for example, for applying the fluid onto a surface, such as for example a surface to be provided with a coating, or onto the surface of another roller.

For example, in a flexographic printing machine, a printing station can typically comprise a so-called print or plate cylinder, arranged to contact the object to be printed, for example, web-like or plate-like objects such as, for example, objects of cardboard or paper. The object to be printed is typically fed between the plate cylinder and another cylinder. The plate cylinder is fed with ink, which is brought into contact with the object to be printed. A printing machine can comprise a plurality of plate cylinders arranged one after the other along a path, and the object to be printed can be transported along that path, so as to sequentially receive ink from these plate cylinders, that is, from one of them after the other. Each of the plate cylinders can be fed with ink of a specific color, whereby multi-color printings can be obtained.

It is known in the art to feed the plate cylinder with ink using a transfer roller, generally a roller having a textured surface including a plurality of cells. This kind of roller is often referred to as an anilox cylinder or anilox roller, and also as a raster roller, screen roller, textured roller, textured cylinder, etc.

To apply a fluid to a transfer roller, such as an anilox roller, it is known in the art to use a fluid distribution device comprising an elongated chamber extending in an axial direction parallel with the longitudinal axis of the transfer roller. The chamber has a longitudinal opening arranged to face the cylinder, so that the fluid can exit the chamber through said elongated opening, and contact the surface of the transfer roller. In order to ensure an even distribution of the fluid, for example, to ensure that the cells are only filled to the rim, an axially extending wiper blade can be placed at one side of the longitudinal opening, extending in the axial direction and arranged to contact the transfer roller when the machine is in use so as to wipe off excessive fluid. Often, a further wiper blade can be arranged at the opposite side of the longitudinal opening. These wiper blades are sometimes referred to as doctor blades. During operation, the wiper blades and the roller together close the longitudinal opening of the chamber. At the axial ends of the chamber, seals are provided that make contact with the transfer roller, thereby closing the chamber at its axial ends. That is, the chamber is closed by doctor blades, the axial seals, and the transfer roller in combination.

One example of this kind of system is disclosed in US-2003/0089256-A1, showing a so-called doctor beam with a U-shaped chamber extending in the axial direction, and with a longitudinal opening facing a transfer roller. Two doctor blades are arranged at respective longitudinal sides of the opening, and these doctor blades are arranged to contact the transfer roller, whereby the doctor beam, the doctor blades and the roller together form the longitudinally or axially extending sides of the chamber. It is explained that at its axial ends, the chamber is closed by end walls or packings. Typically, these kind of end walls or packings are made of an elastomeric material and are arranged to contact the transfer roller, so that the chamber is closed also at its axial ends, thereby avoiding leakage of the fluid such as ink to the exterior, except for the fluid that enters the cells of the transfer roller and thereafter exits the chamber due to the rotation of the transfer roller around its axis.

It is known in the art that the end sealing can be problematic. US-2003/0121435-A1 explains how ink or ink residue can creep along the doctor blades and reach the end seal, and suggests a solution to this problem based on a combination of shortened doctor blades and chambers established by intermediate walls. These intermediate chambers receive ink or ink residue which can thereafter be discharged through bores. End seals are provided as usual.

A problem in the art is the wear of the components, such as the end seals and the doctor blades. These components can be relatively expensive and, in addition, operation of the machine has to be interrupted during replacement. Here, a further problem is that due to the costs, it is generally not preferred to replace all end seals and doctor blades simultaneously. Instead, replacement generally takes place depending on the state of wear of the individual components. This means that the process may have to be interrupted relatively frequently, for example, each time one or two end seals and/or one or two doctor blades have to be replaced.

Another problem in the art is related to the supply of ink to the chamber. U.S. Pat. No. 6,012,391-A discloses how it was known in the art to pump ink into the chamber through a pair of lower inlets, and how ink was known to be recirculated by draining ink back to the ink supply through overflow outlets, whereby ink flow was maintained by a return system. It is explained how prior art systems featured problems with standing waves and sluggish flow, and how wash-up was problematic. U.S. Pat. No. 6,012,391-A suggests a layout with a drain arranged in a lower portion of the chamber near one end of the chamber, and a plurality of inlet ports each of which is angled downwardly and toward the drain.

Also US-2012/0210891-A1 discusses problems related to the supply of ink to a doctor blade chamber, and focuses on the control of the pressure and the use of a pressure adjustment device.

US-2011/0061550-A1 explains how doctor blade chambers are typically mounted at the side of the anilox roller at an angle of about 90° relative to vertical, and how the doctor blade chamber can be pivoted about a horizontal axis to a position where the opening between the doctor blades faces upwardly. It is explained how spilling of ink may be a problem, and how this problem can be solved.

U.S. Pat. No. 6,029,573-A discloses a system using two chambered doctor blade units.

U.S. Pat. No. 5,085,144-A and DE-19516223-A1 both teach doctor blade devices with ink barriers at the end of an ink chamber, the ink barriers being configured to allow ink to exit the chamber through a space established between the respective barrier and a roller. The doctor blade device of DE-19516223-A1 is pivotally arranged so that it can pivot towards the roller.

WO-2009/089672-A1 teaches a further example of a fluid distribution device.

DESCRIPTION OF THE DISCLOSURE

A first aspect of the disclosure relates to a fluid distribution device for applying a fluid, such as ink, oil, varnish, or any other suitable fluid, onto a transfer roller, such as onto a transfer roller in a flexographic printing machine, such as to a textured roller or anilox roller. The device comprises an elongated chamber extending in an axial direction, that is, in a direction parallel with the axis of rotation of the transfer roller when the device is in use, at least one inlet for letting a fluid into the chamber, a longitudinal opening extending in the axial direction and adapted to face a transfer roller when the device is in use so as to allow fluid to exit the chamber and contact the transfer roller, and at least one wiper blade or doctor blade extending along at least a portion of the longitudinal opening, in the axial direction. The chamber has two axial ends, that is, the chamber terminates, in the axial direction, at these two ends, that are facing each other in the axial direction. That is, the device comprises a chamber with an elongated opening and one or more wiper or doctor blades arranged in correspondence with the opening. This arrangement is typical for the so-called doctor blade chambers.

In accordance with this aspect of the disclosure, the chamber comprises, at each of the two axial ends of the chamber, a wall separating the chamber from a cavity, wherein the wall has a wall surface arranged to face the transfer roller when the device is in use, the wall being dimensioned so that the wall surface will be distanced from the transfer roller when the device is in use, so as to allow fluid to be present in a gap or space between the wall surface and the transfer roller.

In this way, these walls partially close the chamber at both of its ends, without any need for the kind of elastomeric seal elements that are conventionally used to close the axial ends of the fluid distribution chamber in this kind of system. As there is no direct contact between the walls and the transfer roller, there is no wear due to friction between the transfer roller and the walls. The walls can thus determine the end of the fluid chamber and the end of the area where fluid is transferred to the transfer roller. The flow out of the chamber at the axial ends is restricted by the walls, so that fluid flow in the axial direction only takes place through the gaps. Thereby, the level of the fluid such as for example ink inside the chamber, that is, between the two walls, can be kept at a constant and uniform level, and the flow out of the chamber can be controlled both in what regards the flow rate and in what regards the velocity, so that the fluid can be received in the respective cavity beyond the respective wall and drained away, without any need for any axial seals that make contact with the transfer roller. Thus, there is no need for any elastomeric seal elements or other friction seal elements, such as those known from US-2003/0121435-A1 discussed above. Also, avoiding the use of elastomeric materials or other friction seal materials can be advantageous as such materials may not always be sufficiently resistant to the fluid to be distributed by the device. Replacing the conventional axial seals that make contact with the transfer roller by a closure based on a wall that can be of the same material as the one defining the rest of the chamber, for example a metallic material such as steel or aluminum, can often be preferred.

Also, it has been found that this arrangement can provide for a continuous circulation or re-circulation of the fluid also at the very ends of the chamber, thereby preventing the fluid from remaining for a very long time in the chamber close to its ends, thereby reducing the risk of, for example, the fluid such as ink drying or otherwise deteriorating at the ends of the chamber, due to for example lack of movement.

On the other hand, as each wall occupies a substantial part of the cross section of the chamber at the end thereof, the cross sectional area of the fluid housing space can be much smaller at the axial positions where the walls are present, than at the axial positions within the chamber, between the walls. That is, the cross sectional area of the fluid housing space between the walls and the transfer roller is much smaller than the cross sectional area of the fluid housing space within the chamber between the two walls. The effect of this is that the velocity of the fluid in the axial direction, that is, towards the longitudinal ends of the device, is much higher at the walls than in the chamber between the walls: the fluid is flowing outwards with much higher velocity between the walls and the transfer roller than inside the chamber, before reaching the walls. This favors a substantially laminar flow inside the chamber, and a higher velocity in the space between the walls and the transfer roller. This arrangement can serve to keep the fluid inside the chamber at a substantially constant level and without major turbulences in the fluid, with a controlled axial drain into the cavities beyond the walls.

This arrangement has also been found helpful when it comes to cleaning the device and the transfer roller, for example, by removing the original fluid, such as an ink, and injecting water.

In some embodiments of the disclosure, the wall surface has a width of at least 5 mm, such as at least 10 mm, such as at least 20 mm, in the axial direction. A substantial width of the wall surface in the axial direction, such as a width of several mm, at least in the area where fluid will be present when the device is in use, can often be preferred to provide for a substantial pressure drop along the fluid film present between the transfer roller and the wall surface, in the axial direction. Thereby, when the fluid exits the gap between the wall and the transfer roller, the velocity of the fluid will not be excessively high. This facilitates effective drain of the fluid and prevents it from exiting the device in other directions than through the drain opening or openings provided in the respective cavity, such as at the bottom of the cavity. Especially, horizontally directed fluid jets or splashes can be prevented or minimized. In many embodiments, the width is less than 50 mm, such as less than 35 or 30 mm.

In some embodiments of the disclosure, the wall surface comprises at least one portion substantially shaped as an arc of a circle, in a plane perpendicular to the axial direction. For example, the portion of the wall surface substantially shaped as an arc of a circle can be shaped so as to substantially match the transfer roller when the device is in use, so that, along at least part of the portion substantially shaped as an arc of a circle (such as, for example, along a part of said portion having a length of at least 1, 2, 3, 5, 10 or 20 cm and/or at least 5°, 10°, 15°, 30°, 45°, 60° or 90° in the circumferential direction), the wall surface will be spaced from a surface of the transfer roller by a gap having a size in a radial direction. In some embodiments of the disclosure this size is substantially constant, and in other embodiments this size can vary, for example, from a relatively large size at a bottom portion to a relatively small or narrow size at the top portion of the gap. In some embodiments, the size can vary during operation of a machine incorporating the device, as a function of wear of the wiper blade.

In some embodiments of the disclosure, the size of the gap or, when the size is not constant in the circumferential direction, the size at a lowermost portion of the gap, in the radial direction is more than 0.5 mm, such as more than 1, 2, 3, or 5 mm, and less than 20 mm, such as less than 15, 10, 5, 3, 2 or 1 mm. When this size is variable as a function of wear of the wiper blade, the given numbers preferably refer to the situation prior to use, that is, prior to wear of the wiper blade.

This gap can thus house fluid in the form of a curved film that serves for a controlled flow of fluid out of the chamber at its axial ends, as explained above. The term "radial direction" refers to a direction in the radial sense in relation to, for example, the axis of the transfer roller.

In accordance with the disclosure, no friction seal elements arranged to contact the transfer roller are provided to close the chamber at the axial ends thereof. As explained above, the use of friction seal elements, such as elastomeric elements for closing the chamber at its axial ends by contacting the transfer roller, implies wear and a need to replace parts when worn out. Using the combination of a wall and a gap with fluid as per the present disclosure, no such seal elements are needed. A controlled flow of fluid out of the chamber and into the drain cavity beyond the chamber can be achieved, and flow inside the chamber towards the axial ends thereof can be kept substantially laminar and without substantial turbulences.

In some embodiments of the disclosure, the chamber is embodied in a beam member, and the walls can be integral parts of said beam member. That is, the chamber can for example be embodied by a recess in the beam member, and the walls can form part of the same beam member.

In some embodiments of the disclosure, the walls are of the same material, such as for example metal, as a body or beam in which the chamber is formed. As the walls are not intended to contact the transfer roller, the walls can be of any suitable material such as metal without any risk of damaging the transfer roller during use of the machine. This allows the use of materials with high resistance to wear and feature, for example, compatibility with the fluid to be distributed. The material of the end walls can be the same as the material defining the rest of the walls of the chamber, that is, the longitudinally extending walls of the chamber. The chamber and the end walls can form an integrated part of, for example, a beam made of a resistant material, such as a metal beam or similar.

In some embodiments of the disclosure, the wall has a thickness in the axial direction that decreases from a root of the wall towards the wall surface, for example, due to a curved shape of the wall in an axial cross section of the device, along the chamber. This is considered to be helpful to guide the fluid towards the gap, thereby enhancing the renewal of fluid within the chamber.

In some embodiments of the disclosure, the device comprises means for modifying the width of the wall surface in the axial direction. Thus, the device can be adapted to fluids of different viscosity by adapting the width of the wall surface in the axial direction. Generally, a larger width can be chosen in the case of a fluid having a lower viscosity, and vice-versa.

In accordance with the disclosure, the device comprises only one wiper blade. Thus, there is one less component present that will suffer wear due to contact with the transfer roller and that will require replacement. Also, the absence of the second wiper blade can be an advantage compared to arrangements such as the one known from U.S. Pat. No. 5,085,144-A, which requires special means for recovery of ink that is removed by the second wiper blade. Also, the use of one instead of two wiper blades facilitates compensation by pivotation in response to wear of the wiper blade.

In some embodiments of the disclosure, the gap has a lowermost point (for example, where the gap meets a wiper blade), and the cavity has a bottom portion, this bottom portion being arranged at a level below the lowermost point of the gap (such as more than 5, 10 or 20 mm below said lowermost point of the gap), at least one drain opening being present in said bottom portion. The cavity preferably has an end wall defining an axial end of the cavity, said end wall being arranged not to contact the transfer roller when the device is in use. Thus, the cavity is arranged to receive fluid exiting the chamber through the gap and to lead said fluid to the drain, without fluid leaving the cavity in the axial direction. Rather, the fluid reaching the cavity is intended to flow downwards due to gravity, and to exit the cavity through a drain outlet.

Another aspect of the disclosure relates to a machine, such as a flexographic printing machine, comprising at least one device as described above, and a corresponding transfer roller arranged to receive fluid from the device. In some embodiments, the gap has a size in the radial direction of the transfer roller, and the device is pivotally arranged so that when the machine is being used, the device will pivot towards the transfer roller due to a reduction of the size of the wiper blade due to wear, so that the size of the gap will decrease during use as a result of the reduction of the size of the wiper blade. Here, the size of the gap will vary, for example, especially at a lower end of the gap, as a result of the wear of the wiper blade: the device will pivot towards the roller, and the size of the gap will decrease with time, until reaching a minimum size. In some embodiments of the disclosure, the minimum size can be, for example, in the order of 0.5-2 mm at the lower and of the gap. This pivotation in response to the wear of the wiper blade may be especially easy to implement in the absence of friction seal elements that abut against the surface of the transfer roller and that might interfere with the pivotation. Also, pivotation in response to the wear of the wiper blade can be easy to implement when the device comprises only one wiper blade. The device can be pivotally arranged so that pivotation towards the transfer roller due to reduction of the size of the wiper blade can be carried out by, for example, means providing a constant and/or controllable biasing force. For example, the device can be biased towards the roller by at least one spring element and/or by pneumatic and/or hydraulic biasing means. Thus, pivotation of the device assisted by suitable biasing means can take place to compensate for wear of the wiper blade.

A further aspect of the disclosure relates to a method of operating a device as described above, comprising the steps of:

placing the device in relation to a transfer roller so that the longitudinal opening faces the transfer roller; and circulating a fluid by pumping the fluid into the chamber and causing part of the fluid to enter the gaps between the wall surfaces and the transfer roller, so that the walls act as partial axial end closures of the chamber, and so that fluid exits the chamber through the gaps. In some embodiments of the disclosure, the method further comprises the step of recirculation fluid exiting the chamber through the gap.

In some embodiments, the method comprises pivoting the device towards a transfer roller (for example, using biasing means comprising one or more spring elements and/or any other suitable means, such as pneumatic and/or hydraulic means) to compensate for a reduction of the size of the wiper blade due to wear.

Another aspect of the disclosure relates to the use of the walls and gaps to allow for axial flow of fluid without any need to use axial friction seals to close off the chamber in relation to the transfer roller.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION OF THE DRAWINGS

Figure 1:
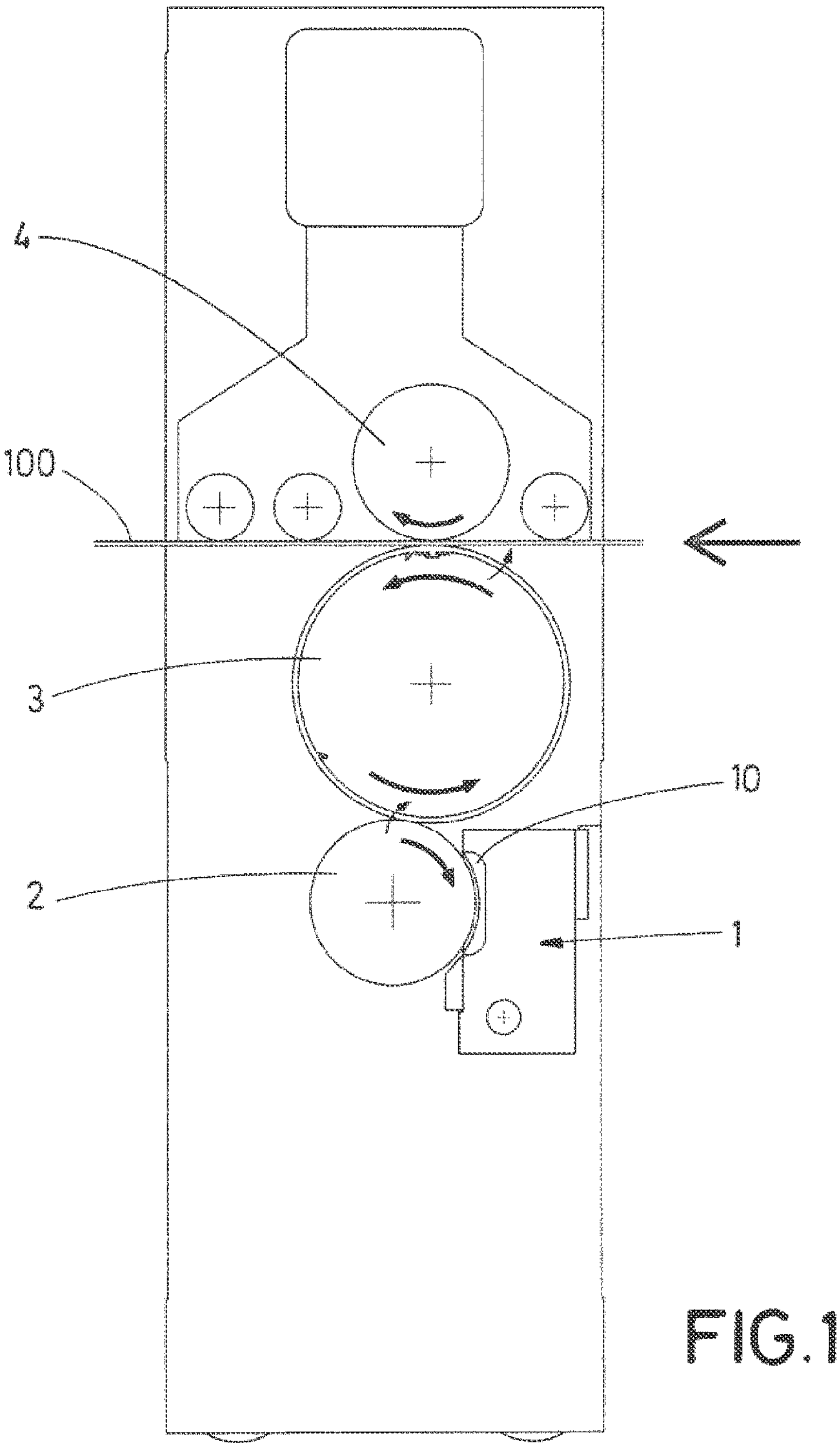
FIG. 1 is a schematic cross sectional view of a printing machine in accordance with an embodiment of the disclosure.

FIG. 1 schematically illustrates a printing machine in accordance with one possible embodiment of the disclosure, including typical components of a flexographic printing machine. The machine is adapted to print web-like objects 100 such as cardboard objects, fed between a plate roller 3 and another roller 4, as known in the art. Ink is transferred to the plate roller 3 using a transfer roller 2. The rollers have cylindrical shapes and circular cross sections, as known in the art. The transfer roller 2 can be an anilox roller with a surface featuring cells, as known in the art.

The transfer roller 2 is arranged to receive a fluid, such as for example ink, from a fluid distribution device 1 of the so-called doctor chamber type, which comprises a beam-like member 13 with a longitudinal recess or chamber 10 extending in an axial direction (parallel with the axis of the transfer roller 2) and with an opening arranged to face the transfer roller, as shown in FIG. 1. A first axially extending doctor blade 11 is arranged at a lower edge of the opening, and in FIG. 1 a second axially extending doctor blade 12 is arranged at an upper edge of the opening. In the disclosure, only the first doctor blade 11 is present, as in the embodiment schematically illustrated in FIGS. 4-7.

Figure 2:
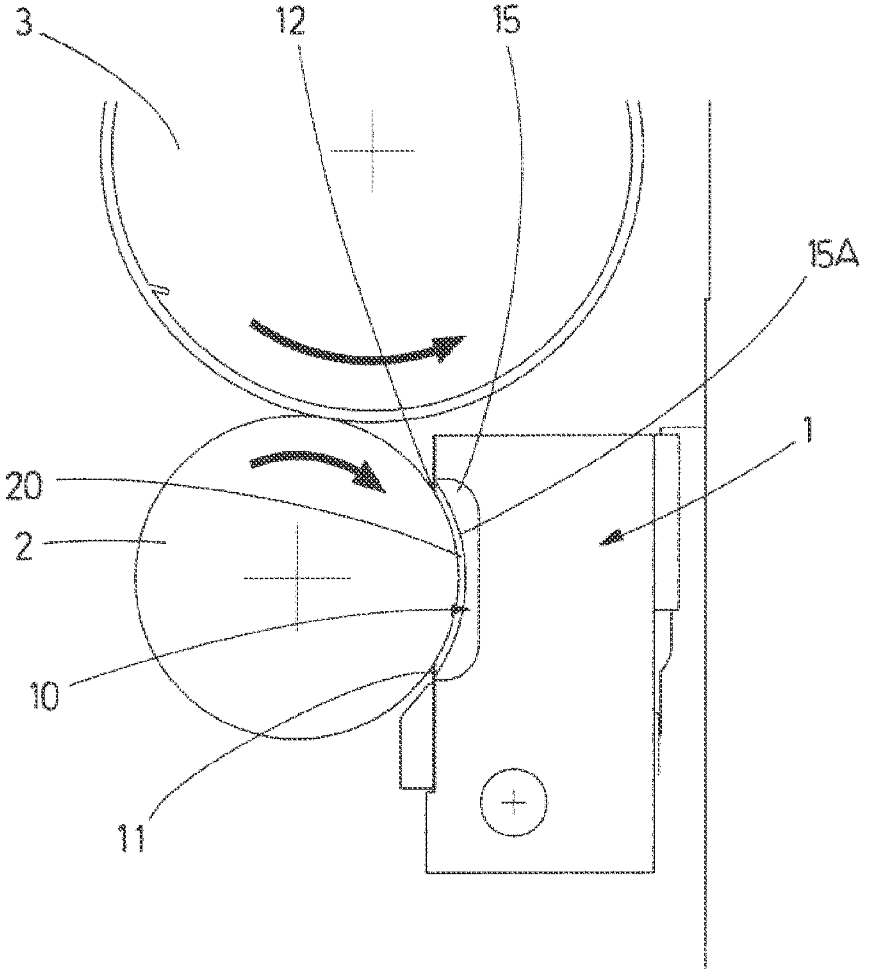
FIG. 2 is an enlarged view of a portion of the machine illustrated in FIG. 1.

The first 11 and second 12 doctor blades can also be observed in FIG. 2, which is an enlarged view of a portion of the machine shown in FIG. 1. In FIG. 2, a wall 15 is shown. This wall 15 is arranged to partially close off the chamber 10 at one axial end thereof. The wall has a surface 15A facing the transfer roller 2, and this surface is shaped as an arc of a circle, in the plane perpendicular to the axis of the transfer roller. Thus, a curved arc-like gap 20 is established between the surface 15A of the wall 15 and the transfer roller 2. This gap 20 typically has a width (when referring to this gap, the term "width" refers to the size of the gap in the radial direction) in the order of 0.5-20 mm, such as in the order of 1-15, 1-10, 1-5 or 1-3 mm. A suitable gap size can be chosen by the person skilled in the art depending on the other characteristics of the system, such as the size of the transfer roller, the desired flow rate and viscosity of the fluid, etc. In this embodiment, the width of the gap is substantially constant, but in other embodiments of the disclosure, the width of the gap can vary along the gap, in the circumferential direction.

This gap 20 is intended to be partially filled with fluid. Another wall and gap closes the other axial end of the chamber. Thus, the walls 15 in combination with the gaps 20 partially filled with fluid close both ends of the chamber 10, thereby avoiding the need for elastomeric seals such as those known in the art. The walls 15 partially close the ends of the chamber 10, allowing a controlled and substantially laminar flow of fluid out of the chamber at the axial ends thereof, between the wall surfaces 15A and the transfer roller 2, that is, through the gap 20, and into the cavity 16.

Figure 3:
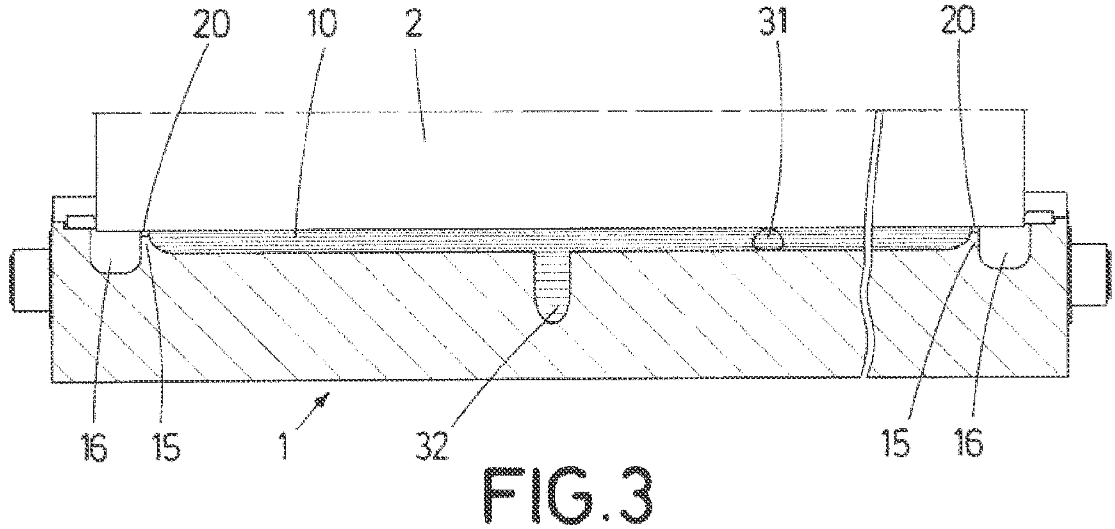
FIG. 3 is a cross-sectional top view of the fluid distribution device in accordance with this embodiment of the disclosure, arranged facing a transfer roller.

FIG. 3 is a cross-sectional top view of the device, with the chamber 10 facing the transfer roller. It is shown how the walls 15 extend towards the transfer roller, leaving a gap 20 between the walls 15 and the transfer roller, a gap arranged to be at least partly filled with fluid when the machine is operating. This thin fluid layer thus completes the end closure of the chamber 10, without any need for direct contact between the walls 15 and the transfer roller 2. This fluid lock or fluid bearing thus provides for a low-friction closure of the axial ends of the chamber 10, without any need for parts such as the elastomeric seal elements conventionally used in the art. Fluid will flow in a substantially controlled manner through the gaps into the cavities 16, which are provided with outlet openings 33 so that the fluid entering the cavities 16 from the chamber 10 can be drained and recirculated if this is desired. Further drains 32 of the overflow type are provided in the chamber 10; one such drain 32 is schematically illustrated in FIG. 3.

Figure 4:
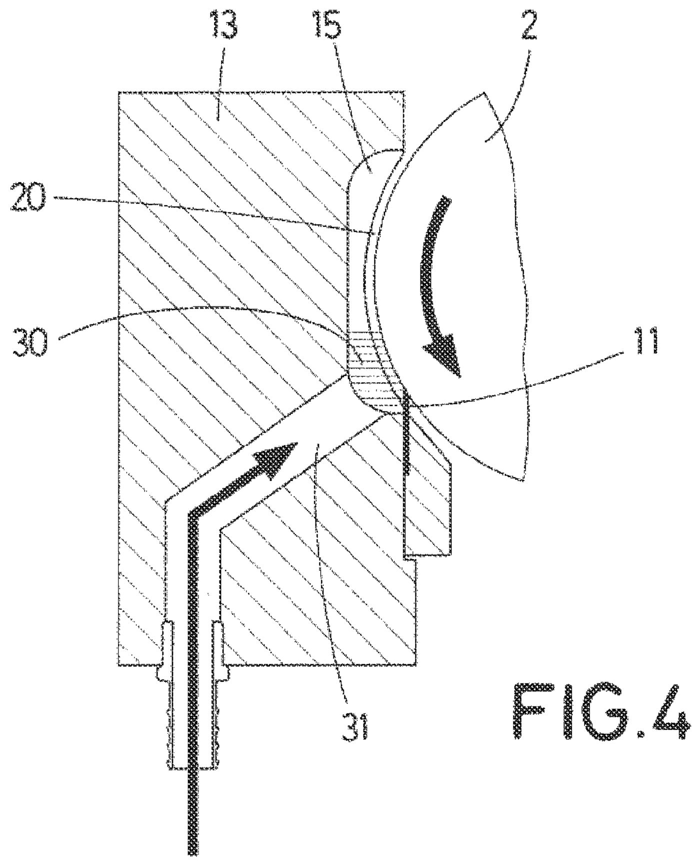
FIGS. 4-7 are lateral cross sectional views of the fluid distribution device facing a transfer roller, at different axial positions.

FIG. 4 is a cross-sectional view of the fluid distribution device facing a transfer roller 2, at an axial position within the chamber 10, in correspondence with one of a plurality of inlets 31 through which the fluid 30, such as ink, can be pumped into the chamber through openings arranged at a bottom portion of the chamber, as schematically illustrated in FIG. 4. The wall 15 with its circular arc shaped surface can be observed at the end of the chamber, and the circular arc shaped gap 20 between the wall 15 and the transfer roller can likewise be observed. FIG. 4 schematically illustrates how the fluid 30 is retained within the chamber, in a space delimited by the wall of the chamber (which is part of the beam 13), the doctor blade 11, and the transfer roller 2.

Figure 5:
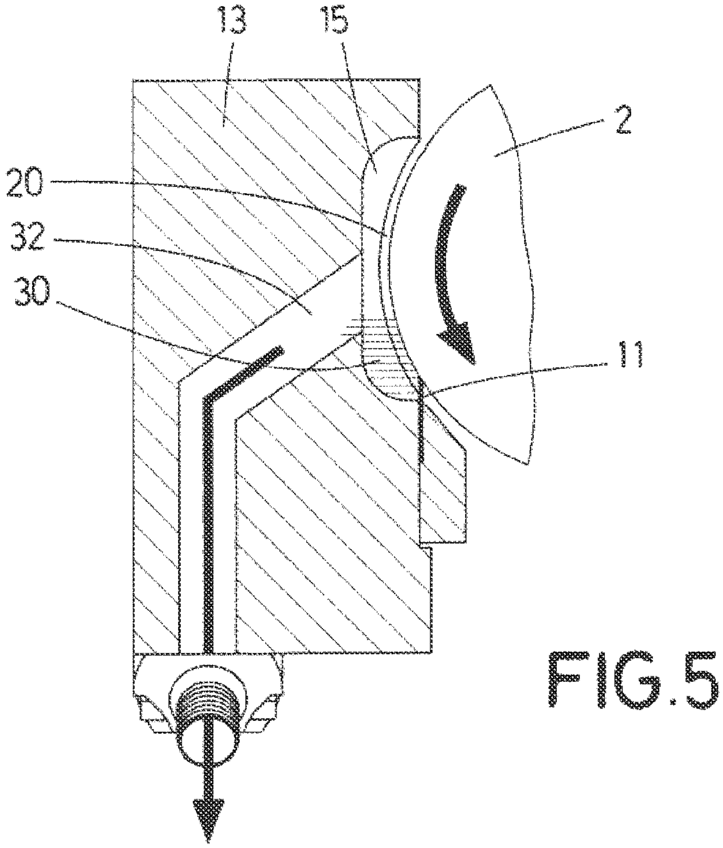

FIG. 5 is likewise a cross-sectional view at an axial position within the chamber, but here in correspondence with an overflow outlet 32, arranged so that when the fluid 30 reaches a certain level in the chamber, it will start to drain out through the outlet 32.

Figure 6:
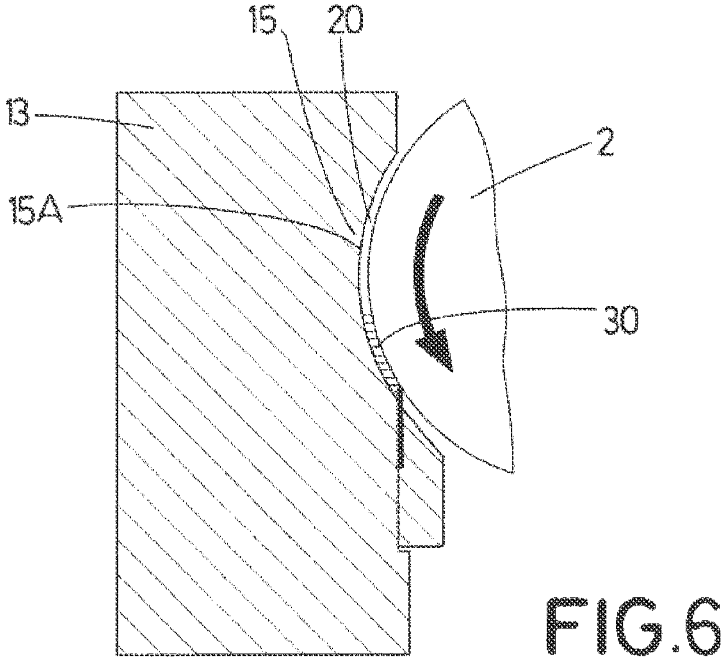

FIG. 6 is a cross-sectional view at an axial position corresponding to the surface 15A of the wall 15. Here, it can be seen how a portion of the gap 20 is filled with fluid, so that this thin fluid layer, together with the wall 15, constitutes a low-friction lock or closure of the chamber 10, whereby the wall 15 partially closes the chamber, with a controlled flow of fluid through the gap 20 into a cavity 16 arranged axially beyond the wall 15.

Figure 7:
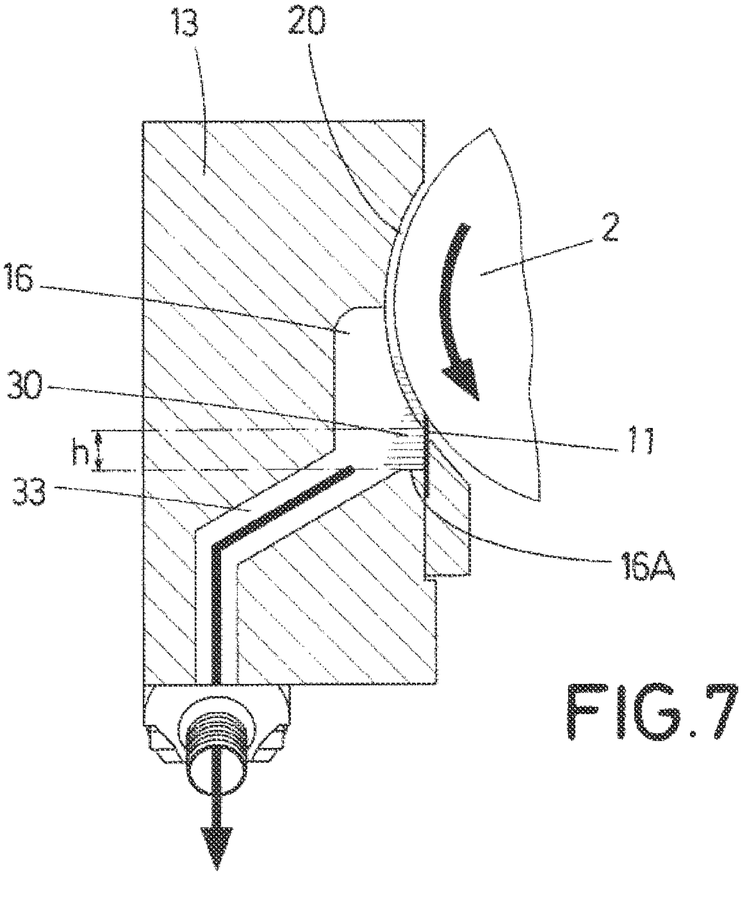
Figure 8:
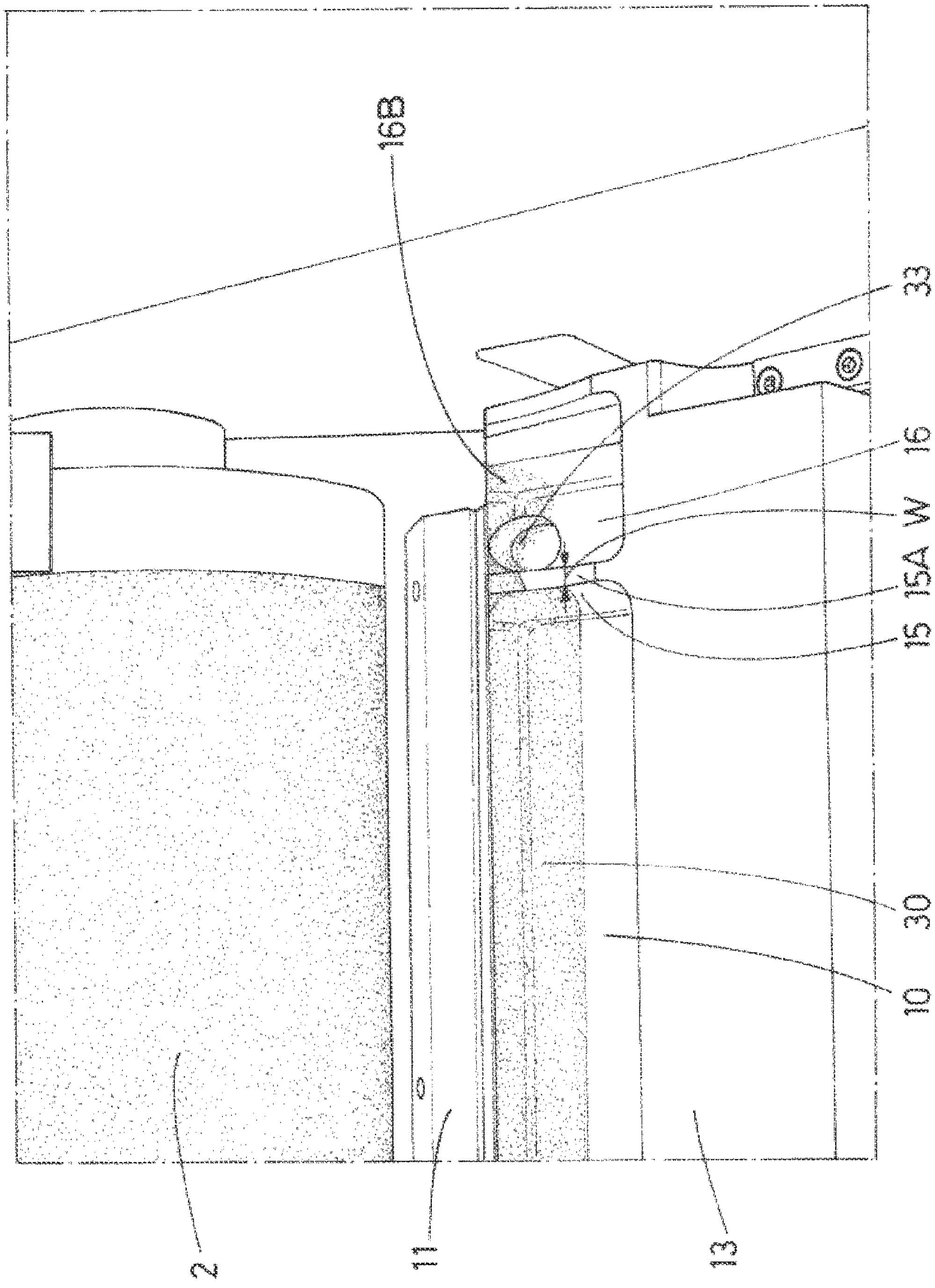
FIG. 8 is a partial top view of a machine in accordance with an embodiment of the disclosure, with the fluid distribution device pivoted away from the roller.

FIG. 7 is a cross-sectional view at an axial position beyond the wall 15, through the end cavity 16. This cavity receives fluid 30 that has penetrated through the gap 20, and a drain outlet 33 is provided through which this fluid can be removed and recirculated if desired. It is shown how the cavity 16 has a bottom portion 16A arranged at a distance h below the bottom portion of the gap 20, so that the fluid exiting the gap 20 will flow downwards from the gap 20, towards the bottom of the cavity 16, instead of continuing flowing in the axial direction. An axial end wall 16B that closes off the cavity 16 at its axial end is schematically illustrated in FIG. 8. It is clear that with this arrangement, the axial flow of the fluid out of the chamber 10 can be controlled so that the fluid ends in the chamber 16 and is drained through the outlet 33, without continuing in the axial direction. Thus, contrary to what is conventional in the art, no axial end seals are needed that close off the chamber against the transfer roller by making contact with the transfer roller. That is, there is no frictional contact between any axial end seals and the transfer roller.

In addition, in some embodiments such as the one shown in FIGS. 4-7, there is only one doctor blade 11. This further reduces the number of components subjected to wear due to contact with the transfer roller 2.

Figure 9:
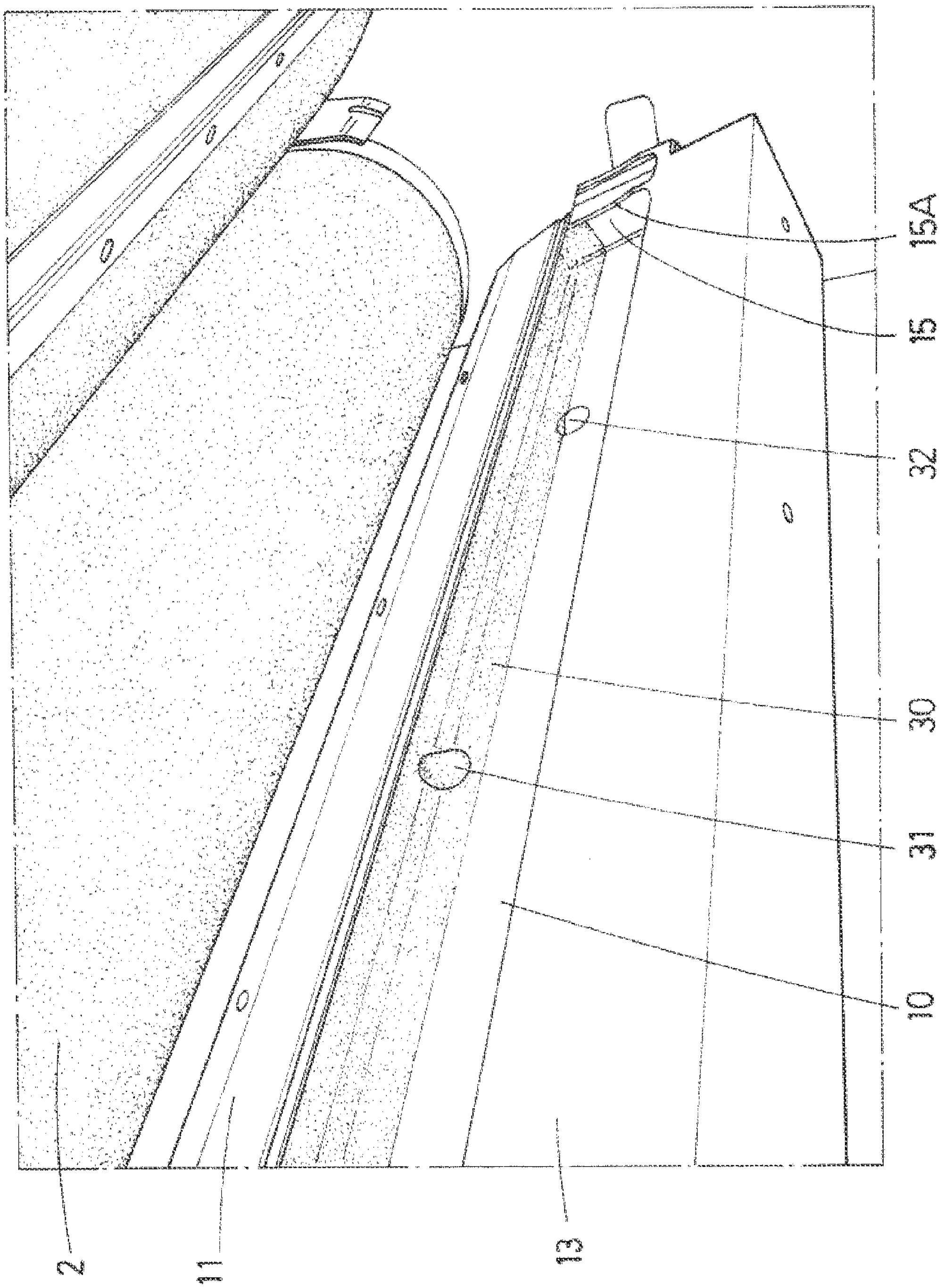
FIG. 9 is a partial perspective view of the machine according to this embodiment, with the fluid distribution device pivoted away from the roller.

FIGS. 8 and 9 schematically illustrate the machine in accordance with this embodiment, with the fluid distribution device or doctor chamber pivoted away from the roller 2, and with traces of the fluid left on the roller and along parts of the inner wall and end wall 15 of the chamber. FIG. 9 schematically illustrates a fluid inlet 31 and an overflow drain outlet 32; it can be seen how the level of the fluid within the chamber reached the lower portion of the drain 32. In FIG. 9, the curved surface 15A of the wall 15 can be observed. In FIG. 8, it can be seen how the wall 15 separates the chamber from the end cavity 16, to which the fluid 30 can flow through the gap between wall and roller, as explained above, and exit through the drain 33.

Figure 10:
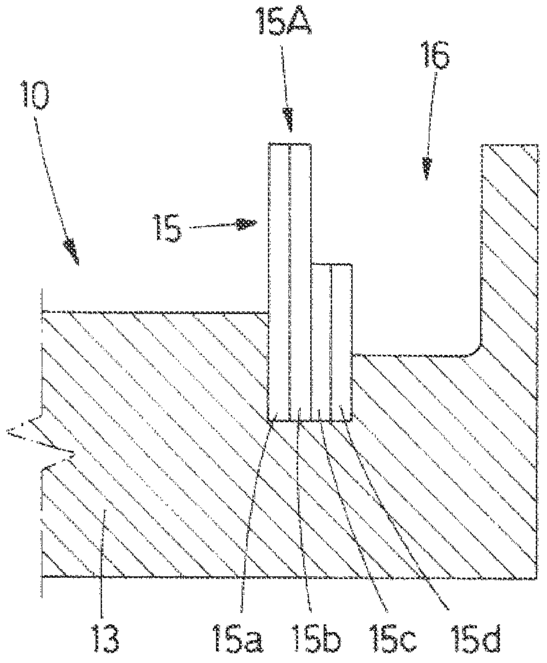
FIG. 10 is a schematic cross-sectional top view illustrating a modular wall arrangement.

In the illustrated embodiment, the width W of the surface 15A of the wall in the axial direction is relatively substantial, as explained above, facilitating a sufficient pressure drop in the axial direction, from one end of the surface 15A to the other, in the axial direction. The width of the wall at the surface can be selected depending on the estimated viscosity of the fluid to be used. If other parameters are unchanged, in principle, the lower the viscosity, the wider the surface of the wall, that is, the thicker the wall at its surface facing the roller. Thus, in some embodiments of the disclosure, it can be preferred to provide for the possibility of modifying the width of the wall. FIG. 10 schematically illustrates one possible embodiment, in which the wall 15 is established by placing a number of inserts 15*a*-15*d* into a recess between the chamber 10 and the cavity 16. By combining higher and lower inserts, the desired width of the surface in the axial direction can be determined. For example, in the case of FIG. 10, the effective width of the surface 15A corresponds to the sum of the widths of the two elements 15*a* and 15*b*.

In FIGS. 3 and 9 it can be seen how in the illustrated embodiment, the inner surface of the wall, that is, the surface facing the interior of the chamber 10, has a curved shape, corresponding to a narrowing of the wall in the direction from the root of the wall towards the surface 15A. This can be preferred in order to facilitate that fluid flows towards the gap also from the rear portion of the chamber, that is, the portion of the chamber that is furthest away from the transfer roller when the device is in use. This can be preferred in order to minimize the maximum time that any portion of the fluid will remain within the chamber. That is, this feature can serve the enhance recirculation of the fluid.

Figure 11A:
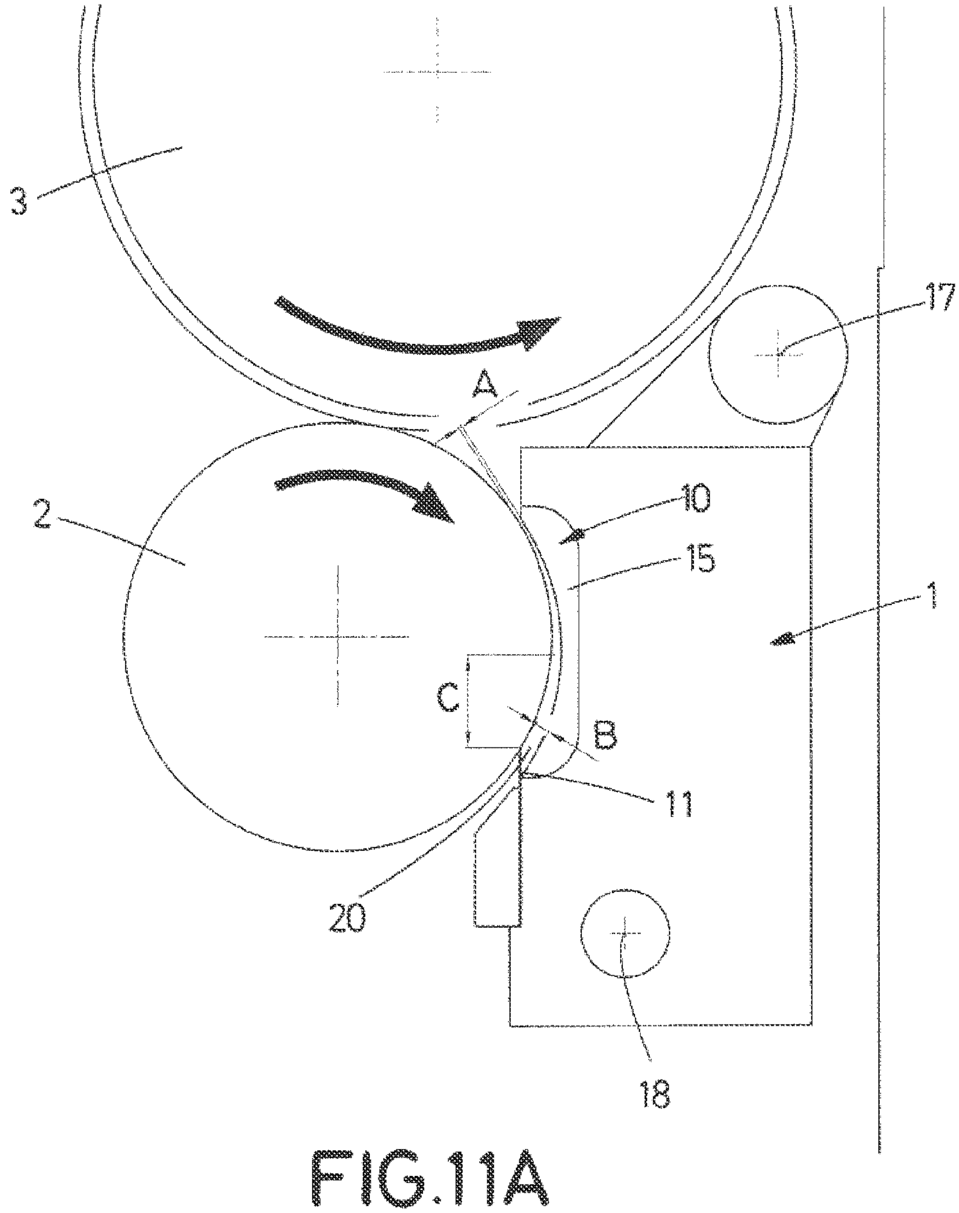
FIGS. 11A and 11B are schematic cross sectional side views of an embodiment of a machine with a pivotally arranged fluid transfer device.
Figure 11B:
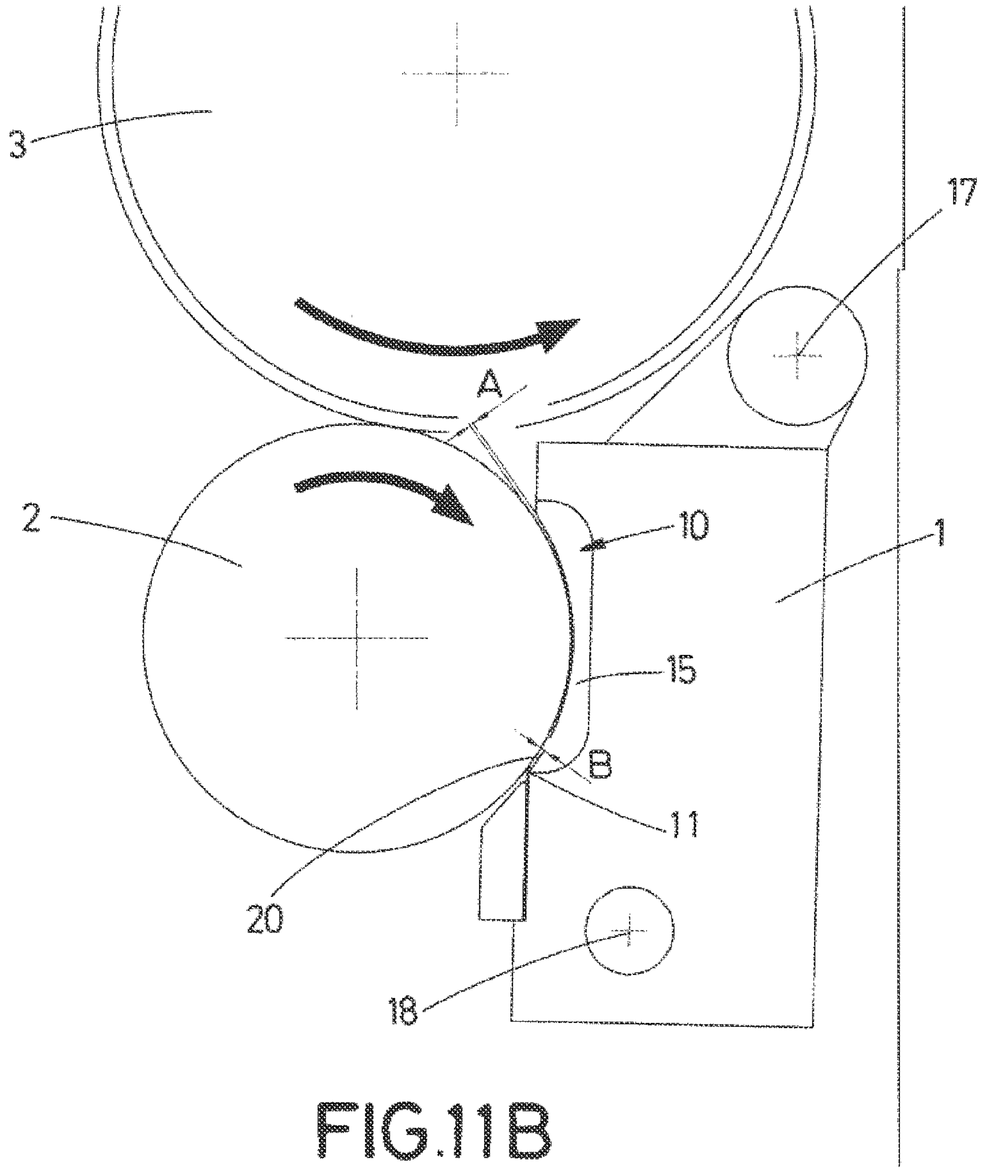

FIGS. 11A and 11B illustrate how the device can be arranged to pivot in relation to an axis 17, so that it can pivot towards the transfer roller 2 as a result of wear of the wiper blade 11. Thus, comparing the gap 20 in FIG. 11A with the gap 20 in FIG. 11B, it is clear that the gap will decrease in size—that is, in what regards its size in the radial direction—during use of the machine, especially at the lowermost end of the gap. For example, in one embodiment, the gap can have a size A in the radial direction at a top portion of the gap between transfer roller 2 and the wall 15, and a size B in the radial direction at a bottom portion of the gap. It can be preferred that the size A be in the order of 1-2 mm both when a new wiper blade is applied (FIG. 11A) and after wear (FIG. 11B), whereas size B can be in the order of 6-15 mm when a new wiper blade is applied (FIG. 11A), and reduced to 1-2 mm when the wiper blade is to be replaced (FIG. 11B). It is clear from FIGS. 11A and 11B that in the illustrated embodiment, this kind of pivotation can be produced by suitable biasing means, for example one or more springs biasing the device towards the roller, and/or pneumatic and/or hydraulic biasing means. A further axis 18 is schematically illustrated: the device can be pivoted around this axis 18 so as to pivot away from the transfer roller, for example, when the wiper blade 11 is to be replaced or when access to the chamber 10 is desired, for example, for cleaning. The dimension C schematically illustrates the level of fluid within the chamber 10 during use of the machine, a level that can typically be in the order of 30-60 mm above the level of the free edge of the wiper blade.

Figure 12:
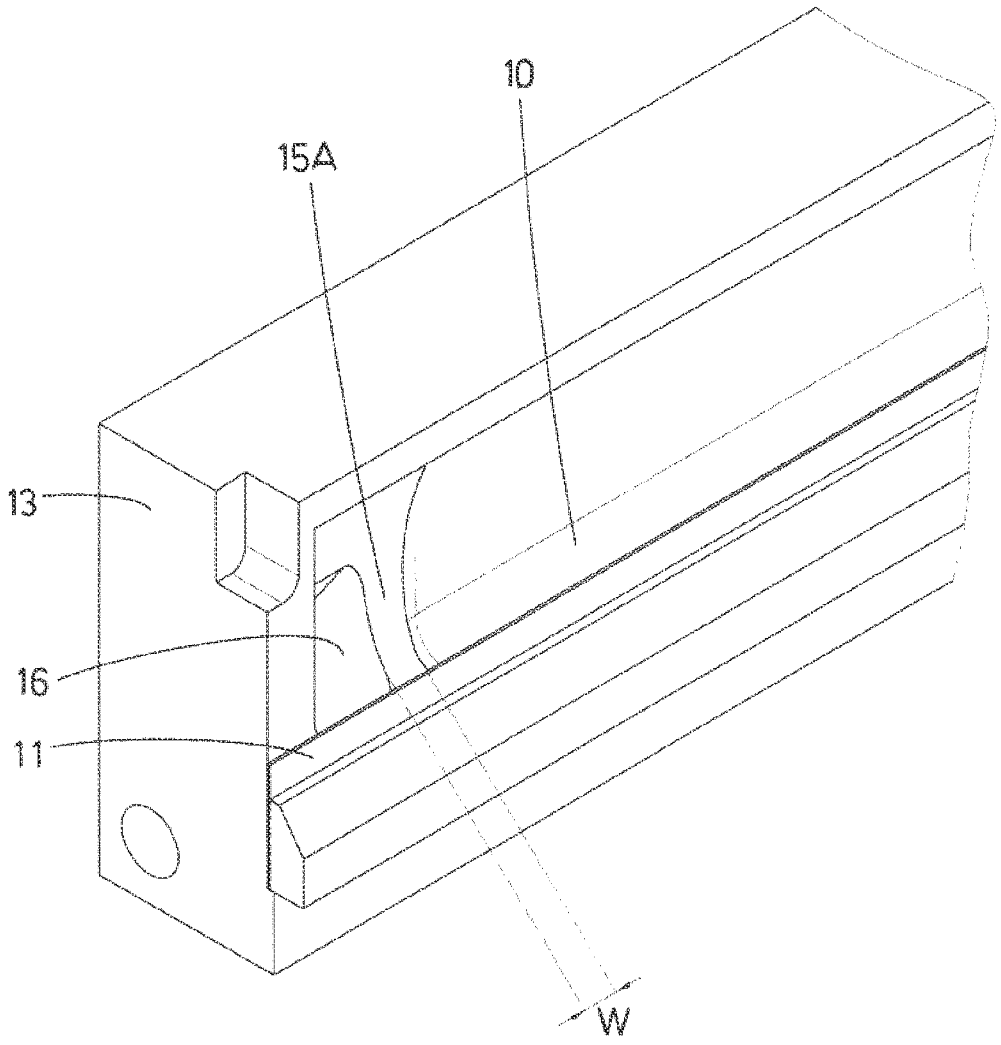
FIG. 12 is schematic perspective view of the device in accordance with an alternative embodiment of the disclosure.

In some embodiments, the wiper blade does not extend all the way to the outermost axial ends of the cavities 16. In other embodiments, such as the one shown in FIG. 12, the wiper blade 12 extends at least to the outermost axial end of the cavity 16, for example, all along the beam 13.

In this text, the term "comprises" and its derivations (such as "comprising", etc.) should not be understood in an excluding sense, that is, these terms should not be interpreted as excluding the possibility that what is described and defined may include further elements, steps, etc.

Unless otherwise indicated, any ranges referred to in this document include the indicated end points.

The disclosure is not limited to the specific embodiment(s) described herein, but also encompasses any variations that may be considered by any person skilled in the art (for example, as regards the choice of materials, dimensions, components, configuration, etc.), within the general scope of the disclosure.

The invention claimed is:

1. A method of operating a machine comprising a transfer roller and a fluid distribution device for applying a fluid onto the transfer roller, the fluid distribution device comprising an elongated chamber extending in an axial direction, at least one inlet for letting a fluid into the chamber, a longitudinal opening extending in the axial direction and adapted to face the transfer roller when the device is in use so as to allow fluid to exit the chamber and contact the transfer roller, and a wiper blade extending along at least a portion of the longitudinal opening, in the axial direction, the chamber having two axial ends; wherein the chamber includes, at each of the two axial ends of the chamber, a wall separating the chamber from a cavity, wherein the wall has a wall surface arranged to face the transfer roller when the device is in use, the wall being dimensioned so that the wall surface will be distanced from the transfer roller when the device is in use, so as to allow fluid to exit the chamber via a gap between the wall surface and the transfer roller, wherein no friction seal elements arranged to contact the transfer roller are provided to close the chamber at the axial ends thereof, and the device comprises only one wiper blade, the wiper blade being arranged at a lower edge of the longitudinal opening, the transfer roller being arranged to rotate in a direction such that a surface of the transfer roller facing the longitudinal opening moves downwards during rotation of the transfer roller and the wiper blade is configured to remove excess fluid received by the transfer roller via the opening during rotation of the transfer roller, wherein the cavity is configured to receive the fluid that exits the chamber through the gap and is configured to lead the fluid towards a drain outlet, and whereby the drain outlet is connected to and extends from the cavity, the drain outlet being configured to receive the fluid entering the cavity from the chamber, such that the fluid is drained through the drain outlet and recirculated, the method including the following steps:

- placing the device in relation to the transfer roller so that the longitudinal opening faces the transfer roller; and
- circulating a fluid by pumping the fluid into the chamber and causing part of the fluid to enter the gaps between the wall surfaces and the transfer roller, so that the walls act as partial axial end closures of the chamber, and so that fluid exits the chamber through the gaps,
- rotating the transfer roller in a direction such that a surface of the transfer roller facing the longitudinal opening moves downwards during rotation of the transfer roller and the wiper blade removes excess fluid received by the transfer roller via the opening while rotating the transfer roller,
- receiving the fluid that exits the chamber through each gap in the respective cavity, and each respective cavity leads the fluid towards a drain outlet that is connected to and extends from the cavity, and
- draining the fluid through the drain outlet and recirculating the fluid.

2. The method of claim 1, wherein the wall surface has a width of at least 20 mm in the axial direction.

3. The method of claim 1, wherein the wall surface comprises at least one portion substantially shaped as an arc of a circle, in a plane perpendicular to the axial direction.

4. The method of claim 3, wherein the portion of the wall surface substantially shaped as an arc of a circle is shaped so as to substantially match the transfer roller when the device is in use, so that, along at least part of the portion substantially shaped as an arc of a circle, the wall surface will be spaced from a surface of the transfer roller by a gap having a size in a radial direction wherein the size of the gap in the radial direction is more than 0.5 mm and less than 20 mm.

5. The method of claim 1, wherein the chamber is embodied in a beam member, and wherein the walls are integral parts of said beam member.

6. The method of claim 1, wherein the walls are of the same material as a body in which the chamber is formed.

7. The method of claim 1, wherein the wall has a thickness in the axial direction that decreases from a root of the wall towards the wall surface.

8. The method of claim 1, comprising a plurality of inserts wherein each insert is configured to provide a width to the wall surface.

9. The method of claim 1, wherein the gap has a lowermost point, and wherein the cavity has a bottom portion, said bottom portion being arranged at a level of at least 10 mm below the lowermost point of the gap, at least one drain opening being present in said bottom portion, and wherein the cavity has an end wall defining an axial end of the cavity, said end wall being arranged not to contact the transfer roller when the device is in use.

10. The method according to claim 1, wherein the gap has a size in the radial direction of the transfer roller, and wherein the device is pivotally arranged so that when the machine is being used, the device will pivot towards the transfer roller due to a reduction of the size of the wiper blade due to wear, so that the size of the gap will decrease during use as a result of the reduction of the size of the wiper blade.

11. The method according to claim 10, wherein the device is pivotally arranged so that pivotation towards the transfer roller due to reduction of the size of the wiper blade is caused by biasing means.

12. The method of claim 1, wherein the wall surface has a width of at least 10 mm in the axial direction.

13. The method of claim 1, wherein the wall surface has a width of at least 5 mm in the axial direction.

14. The method of claim 1, wherein the wall surface is spaced from a surface of the transfer roller by a gap having a size, at a lowermost portion of the gap, in a radial direction of at least 5 mm.

15. A method of operating a machine comprising a transfer roller and a fluid distribution device for applying a fluid onto the transfer roller, the fluid distribution device comprising an elongated chamber extending in an axial direction, at least one inlet for letting a fluid into the chamber, a longitudinal opening extending in the axial direction and adapted to face the transfer roller when the device is in use so as to allow fluid to exit the chamber and contact the transfer roller, and a wiper blade extending along at least a portion of the longitudinal opening, in the axial direction, the chamber having two axial ends; wherein the chamber includes, at each of the two axial ends of the chamber, a wall separating the chamber from a cavity, wherein the wall has a wall surface arranged to face the transfer roller when the device is in use, the wall being dimensioned so that the wall surface will be distanced from the transfer roller when the device is in use, so as to allow fluid to exit the chamber via a gap between the wall surface and the transfer roller, wherein no friction seal elements arranged to contact the transfer roller are provided to close the chamber at the axial ends thereof, and the device comprises only one wiper blade, the wiper blade being arranged at a lower edge of the longitudinal opening, the transfer roller being arranged to rotate in a direction such that a surface of the transfer roller facing the longitudinal opening moves downwards during rotation of the transfer roller and the wiper blade is configured to remove excess fluid received by the transfer roller via the opening during rotation of the transfer roller, wherein the cavity is configured to receive the fluid that exits the chamber through the gap and is configured to lead the fluid towards a drain outlet, and whereby the drain outlet is connected to and extends from the cavity, the drain outlet being configured to receive the fluid entering the cavity from the chamber, such that the fluid is drained through the drain outlet and recirculated, wherein the gap has a size in the radial direction of the transfer roller, and wherein the device is pivotally arranged so that when the machine is being used, the device will pivot towards the transfer roller due to a reduction of the size of the wiper blade due to wear, so that the size of the gap will decrease during use as a result of the reduction of the size of the wiper blade, the method including the following steps:

placing the device in relation to the transfer roller so that the longitudinal opening faces the transfer roller;

circulating a fluid by pumping the fluid into the chamber and causing part of the fluid to enter the gaps between the wall surfaces and the transfer roller, so that the walls act as partial axial end closures of the chamber, and so that fluid exits the chamber through the gaps; and pivoting the device towards the transfer roller compensating for a reduction of the size of the wiper blade due to wear, rotating the transfer roller in a direction such that a surface of the transfer roller facing the longitudinal opening moves downwards during rotation of the transfer roller and the wiper blade removes excess fluid received by the transfer roller via the opening while rotating the transfer roller, receiving the fluid that exits the chamber through each gap in the respective cavity, and each respective cavity leads the fluid towards a drain outlet that is connected to and extends from the cavity, and draining the fluid through the drain outlet and recirculating the fluid.

16. The method of claim 15, wherein the wall surface is spaced from a surface of the transfer roller by a gap having a size, at a lowermost portion of the gap, in a radial direction of at least 5 mm.

17. A method of operating a machine comprising a transfer roller and a fluid distribution device for applying a fluid onto the transfer roller, the fluid distribution device comprising an elongated chamber extending in an axial direction, at least one inlet for letting a fluid into the chamber, a longitudinal opening extending in the axial direction and adapted to face the transfer roller when the device is in use so as to allow fluid to exit the chamber and contact the transfer roller, and only one wiper blade extending along at least a portion of the longitudinal opening, in the axial direction, the chamber having two axial ends; wherein the chamber includes, at each of the two axial ends of the chamber, a wall separating the chamber from a cavity, wherein the wall has a wall surface arranged to face the transfer roller when the device is in use, the wall being dimensioned so that the wall surface will be distanced from the transfer roller when the device is in use, so as to allow fluid to exit the chamber via a gap between the wall surface and the transfer roller, wherein the cavity is configured to receive the fluid that exits the chamber through the gap and is configured to lead the fluid towards a drain outlet, whereby the drain outlet is connected to and extends from the cavity, the drain outlet being configured to receive the fluid entering the cavity from the chamber, such that the fluid is drained through the drain outlet and recirculated, and wherein the only one wiper blade is arranged at a lower edge of the longitudinal opening, the transfer roller being arranged to rotate in a direction such that a surface of the transfer roller facing the longitudinal opening moves downwards during rotation of the transfer roller and the only one wiper blade is configured to remove excess fluid received by the transfer roller via the opening during rotation of the transfer roller, the method including the following steps:

placing the device in relation to the transfer roller so that the longitudinal opening faces the transfer roller; and circulating a fluid by pumping the fluid into the chamber and causing part of the fluid to enter the gaps between the wall surfaces and the transfer roller, so that the walls act as partial axial end closures of the chamber, and so that fluid exits the chamber through the gaps, rotating the transfer roller in a direction such that a surface of the transfer roller facing the longitudinal opening moves downwards during rotation of the transfer roller and the wiper blade removes excess fluid received by the transfer roller via the opening while rotating the transfer roller, receiving the fluid that exits the chamber through each gap in the respective cavity, and each respective cavity leads the fluid towards a drain outlet that is connected to and extends from the cavity, and draining the fluid through the drain outlet and recirculating the fluid.

18. The method of claim 17, wherein the gap is configured to be at least partially filled with fluid, such that the walls disposed at each of the two axial ends partially close the ends of the chamber, providing a controlled and substantially laminar flow of fluid exiting the chamber.

19. The method of claim 17, wherein the wall surface is spaced from a surface of the transfer roller by a gap having a size, at a lowermost portion of the gap, in a radial direction of at least 5 mm.

20. The method of claim 17, wherein the gap has a lowermost point, and wherein the cavity has a bottom portion, said bottom portion being arranged at a level of at least 10 mm below the lowermost point of the gap, at least one drain opening being present in said bottom portion, and wherein the cavity has an end wall defining an axial end of the cavity, said end wall being arranged not to contact the transfer roller when the device is in use.

21. A method of operating a machine comprising a transfer roller and a fluid distribution device for applying a fluid onto the transfer roller, the fluid distribution device comprising an elongated chamber extending in an axial direction, at least one inlet for letting a fluid into the chamber, a longitudinal opening extending in the axial direction and adapted to face the transfer roller when the device is in use so as to allow fluid to exit the chamber and contact the transfer roller, and a wiper blade extending along at least a portion of the longitudinal opening, in the axial direction, the chamber having two axial ends; wherein the chamber includes, at each of the two axial ends of the chamber, a wall separating the chamber from a cavity, wherein the wall has a wall surface arranged to face the transfer roller when the device is in use, the wall being dimensioned so that the wall surface will be distanced from the transfer roller when the device is in use, so as to allow fluid to exit the chamber via a gap between the wall surface and the transfer roller, wherein the wiper blade is arranged at a lower edge of the longitudinal opening, the transfer roller being arranged to rotate in a direction such that a surface of the transfer roller facing the longitudinal opening moves downwards during rotation of the transfer roller and the wiper blade is configured to remove excess fluid received by the transfer roller via the opening during rotation of the transfer roller, and wherein the cavity is configured to receive the fluid that exits the chamber through the gap and is configured to lead the fluid towards a drain outlet, whereby the drain outlet is connected to and extends from the cavity, the drain outlet being configured to receive the fluid entering the cavity from the chamber, such that the fluid is drained through the drain outlet and recirculated, the method including the following steps:

placing the device in relation to the transfer roller so that the longitudinal opening faces the transfer roller;

circulating a fluid by pumping the fluid into the chamber and causing part of the fluid to enter the gaps between the wall surfaces and the transfer roller, so that the walls act as partial axial end closures of the chamber, and so that fluid exits the chamber through the gaps, rotating the transfer roller in a direction such that a surface of the transfer roller facing the longitudinal opening moves downwards during rotation of the transfer roller and the wiper blade removes excess fluid received by the transfer roller via the opening while rotating the transfer roller, receiving the fluid that exits the chamber through each gap in the respective cavity, and each respective cavity leads the fluid towards a drain outlet that is connected to and extends from the cavity, and draining the fluid through the drain outlet and recirculating the fluid.

22. The method of claim 21, wherein no wiper blade is arranged at an upper edge of the longitudinal opening such that the chamber is open in correspondence with the upper edge.

23. The method of claim 21, wherein the wall surface is spaced from a surface of the transfer roller by a gap having a size, at a lowermost portion of the gap, in a radial direction of at least 5 mm.

24. The method of claim 21, wherein the gap is configured to be at least partially filled with fluid, such that the walls disposed at each of the two axial ends partially close the ends of the chamber, providing a controlled and substantially laminar flow of fluid exiting the chamber.

25. The method of claim 21, wherein the gap has a lowermost point, and wherein the cavity has a bottom portion, said bottom portion being arranged at a level of at least 10 mm below the lowermost point of the gap, at least one drain opening being present in said bottom portion, and wherein the cavity has an end wall defining an axial end of the cavity, said end wall being arranged not to contact the transfer roller when the device is in use.

26. The method of claim 21, wherein no friction seal elements arranged to contact the transfer roller are provided to close the chamber at the two axial ends.

* * * * *